United States Patent Office 3,480,439
Patented Nov. 25, 1969

3,480,439
LIGHT-SENSITIVE MATERIALS OPTICALLY SENSITIZED WITH CHLOROPROPYLSULFONIC ACID SUBSTITUTED MEROCYANINES
Helmut Kampfer, Cologne-Stammheim, Johannes Götze, Bergisch-Neukirchen, and Oskar Riester and Erich Böckly, Leverkusen, Germany, assignors to Agfa-Gevaert Aktiengesellschaft, Leverkusen, Germany, a corporation of Germany
No Drawing. Filed Sept. 28, 1965, Ser. No. 491,014
Claims priority, application Germany, Oct. 15, 1965,
A 47,336
Int. Cl. G03c 1/10
U.S. Cl. 96—102     6 Claims

ABSTRACT OF THE DISCLOSURE

Light-sensitive materials, more especially silver halide emulsions, are optically sensitized with merocyanines containing heterocyclic nitrogen atoms at least one of which is substituted with a chloropropylsulfonic acid radical.

---

Merocyanine dyes with heterocyclic rings having nitrogens substituted with alkyl radicals, are generally insoluble in water and almost insoluble in organic solvents. This disadvantage can be overcome by substituting on at least one of the alkyl radicals attached to the nitrogen atoms of the heterocyclic rings, a water-solubilizing group, in particular sulfo groups. Although, the water solubility of the resulting dyes is sufficient and the dyes can be washed out satisfactorily from the emulsion layers, the sensitizing effect is insufficient. Particularly the decay of the sensitization of these sensitizing dyes is not steep enough towards longer wavelength so that the dark room safety of such sensitizers does not meet the requirements.

It is among the objects of the present invention to provide merocyanine dyes with improved properties. A further object is to provide silver halide emulsions which are sensitized with such merocyanines.

The above objects have been attained by providing merocyanine sensitizing dyes which contain heterocyclic nitrogen atoms at least one of which is substituted by a 2-chloropropyl radical with a terminal sulfo group. Particularly suitable are "methine-free" and dimethine merocyanines. By the term "methine-free" merocyanines is meant those merocyanines which do not contain any methine chain between the two heterocyclic rings.

The invention comprises preferably merocyanines of the following formula:

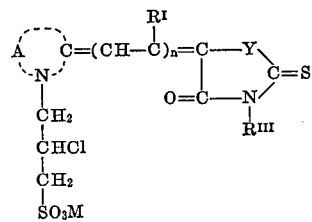

wherein:

A = the non-metallic ring members necessary to complete a 5- or 6-membered nitrogen containing heterocyclic ring to which may be fused a benzene or naphthalene ring. Suitable heterocyclic rings are for example those of the thiazole series (e.g., thiazole, 4-methylthiazole, 5-methylthiazole, 4-phenylthiazole, 5-phenylthiazole, 4,5-dimethylthiazole, 4,5 - diphenylthiazole, 4 - (2 - thienyl)-thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5 - methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 6-iodobenzothiazole, 4-ethoxybenzothiazole, 5-ethoxybenzothiazole, tetrahydrobenzothiazole, 5,6 - dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 7-methoxy - α - naphthothiazole, 8-methoxy-α-naphthothiazole, etc.), those of the thianaphtheno-7',6',4,5-thiazole series (e.g., 4'-methoxythiananaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.) those of the benzoxazole series (e.g., benzoxazole, 5-chlorobenzoxazole, 5 - phenylbenzoxazole, 5 - methylbenzoxazole, 6-methylbenzoxazole, 5,6 - dimethylbenzoxazole, 4,6 - dimethylbenzoxazole, 5 - methoxybenzoxazole, 6-methoxybenzoxazole, 5-ethoxybenzoxazole, 6-chlorobenzoxazole, 5 - hydroxybenzoxazole, 6 - hydroxybenzoxazole, etc.), those of the naphthoxazole series (e.g., α - naphthoxazole, β - naphthoxazole, etc.), those of the selenazole series (e.g., 4 - methylselenazole, 4 - phenylselenazole, etc.), those of the benzoselenazole series (e.g., benzoselenazole, 5 - chlorobenzoselenazole, 5 - methoxybenzoselenazole, 5 - hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the isoquinoline series (e.g., isoquinoline, 3,4-dihydroisoquinoline, etc.), those of the 3,3-dialkylindolenine series (e.g., 3,3-dimethylindolenine, 3,3,5-trimethylindolenine, 3,3,7-trimethylindolenine, etc.), those of the pyridine series (e.g., pyridine, 3-methylpyridine, 4-methylpyridine, 6-methylpyridine, 3,4-dimethylpyridine, 3,5-dimethylpyridine, 3,6-dimethylpyridine, 4-chloropyridine, 5-chloropyridine, 6-chloropyridine, 3-hydroxypyridine, 4-hydroxypyridine, 6-hydroxypyridine, 3-phenylpyridine, 4-phenylpyridine, 6-phenylpyridine, 3-chloropyridine, 2,3-dimethylpyridine, 2-hydroxypyridine, etc.), those of the oxazine or benzoxazine series, those of the thiodiazole, oxadiazole, imidazole or benzimidazole series or those of the pyrimidine, pyrroline or indoline series.

The heterocyclic rings can be further substituted with alkyl groups, more especially short-chain alkyl groups with up to 5 carbon atoms, alkoxy groups preferably containing up to 5 carbon atoms, alkylmercapto groups containing up to 5 carbon atoms, methylenedioxy groups of the formula —OCH$_2$O— halogens such as chlorine or bromine, and aryl such as phenyl;

$R^I$ represents hydrogen or alkyl, preferably with up to 5 carbon atoms, more especially methyl or ethyl;

$n$ represents 0 to 1;

Y represents sulfur or an imino group of the Formula NR$^{II}$;

R$^{II}$ represents alkyl with up to 5 carbon atoms or aryl, more especially phenyl;

R$^{III}$ represents saturated or olefinically unsaturated alkyl with preferably up to 5 carbon atoms, more especially methyl, ethyl or allyl, aryl preferably a phenyl group, aralkyl more especially phenylalkyl such as phenylethyl or benzyl or alkyl with preferably up to 5 carbon atoms and substituted by carboxyl groups or sulfonic acid groups, for example, carboxymethyl; and M represents a cation. The chemical nature of the cation is not critical and it can be selected in accordance with the requirement of the method of making the sensitizing dye. Generally M is a cation of an alkali metal, such as sodium or potassium, or an ammonium cation which may contain lower alkyl groups, for example, methyl or ethyl ammonium cations.

Particularly preferred are those dyestuffs in which A of the general formula represents the ring members necessary for completing the following heterocyclic rings: a thiazole, a benzthiazole, an oxazole, a benzoxazole, a thiadiazole or a pyrroline.

Particularly preferred are dyes the heterocyclic ring of which contains a methylenedioxy grouping on a fused-on benzene ring.

The merocyanines of the present invention have the following advantages:

(a) Excellent sensitizer effect, both with black-and-white and with color photographic materials.
(b) A sharp decay of the sensitization curves towards the longer wavelength. This leads to increased safety in the dark room for the photographic materials sensitized with the merocyanines according to the invention.
(c) Low discoloration of the photographic layer, since the dyes can be easily washed out.
(d) The dyes can be prepared in a very simple manner.

Particular utility is exhibited by the dyes of the following formulae:

Dye I:

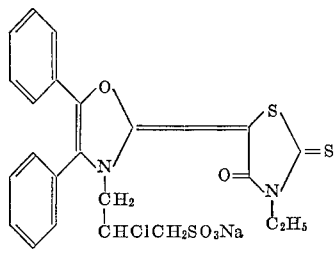

Dye II:

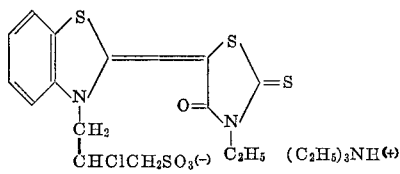

Dye III:

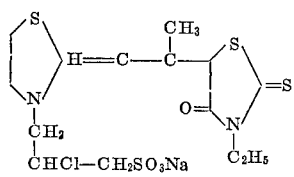

Dye IV:

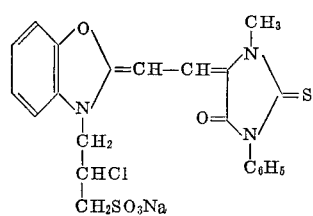

Dye V:

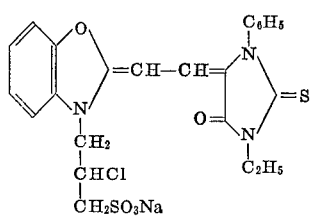

Dye VI:

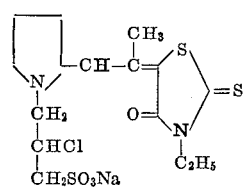

Dye VII:

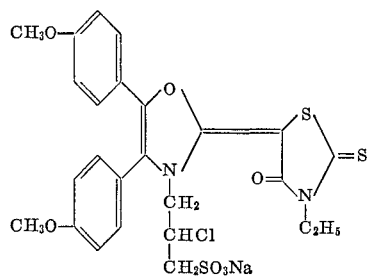

Dye VIII:

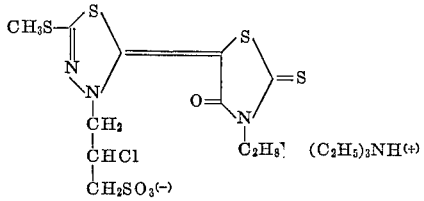

Dye IX:

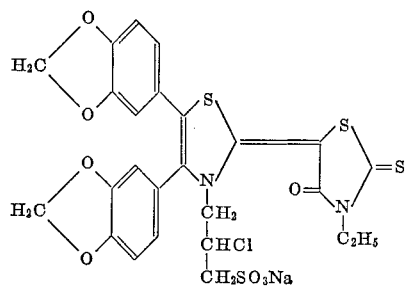

Silver halide emulsion layers which contain silver chloride, silver bromide or mixtures thereof and which might additionally contain up to 10 mol percent of silver iodide can be used as light-sensitive layers. Gelatin is preferred as binder for the light-sensitive layers, but this can be wholly or partially replaced by other layer-forming, hydrophilic colloids, depending upon the properties which are required. Suitable, for example, are polyvinyl alcohol, polyvinyl pyrrolidone, starch or starch ether, alginic acid and derivatives thereof such as salts particularly with alkali metals, esters or amides, or carboxymethyl cellulose and the like.

The silver halide emulsions which are to be optically sensitized are produced in accordance with common practice. Preparation of photographic emulsions involves 3 separate steps:

(1) Precipitation of the silver halide and physical ripening in the presence of gelatin.
(2) Freeing of the emulsion of excess water soluble salts usually by washing and (3) After-ripening or chemical-ripening to obtain the desired speed.

The dyes of the present invention are advantageously incorporated in the washed and finished emulsion and should be uniformly distributed throughout the emulsion. The methods of incorporating the dyes in an emulsion are simple and well known to those skilled in the art of emulsion making. It is convenient to add the dyes from solution in appropriate solvents such as alcohols and phenols or in a mixture of those solvents with water. The solvents must be compatible with the emulsion and substantially free from any deleterious effect on the silver halide emulsion. Water or methanol or a mixture thereof has proven satisfactory as a solvent for the majority of the new dyes.

The concentration of the sensitizing dyes of the present invention in the silver halide emulsion can vary widely, for example, from about 2 to 200 mg. preferably 10 to 60 mg. per kg. of the emulsion. The concentration of the dye will vary according to the type of light-sensitive material in the emulsion and according to sensitization desired. The suitable and optimal concentration for any given emulsion will be apparent to those skilled in the art upon making the ordinary tests customarily used in the art of emulsion making.

The photographic emulsions may be coated on any of the photographic supports including, paper, cellulose esters such as cellulose acetate or nitrate, polystyrene, polyesters in particular polyethylene terephthalate, polycarbonates, preferably of bis-hydroxy phenyl alkanes, and the like.

The emulsions can also be chemically sensitized by any of the accepted procedures. The emulsions can be treated with salts of noble metals such as ruthenium, rhodium, palladium, iridium or platinum. Suitable compounds are well known in the art. The emulsions can also be sensitized with gold salts as described by R. Koslowsky, Z. wiss. phot. 46, 1951, 65–72.

Emulsions can also be chemically sensitized with reducing agents, such as stannous salts, polyamines, sulfur compounds such as described in the U.S. Patent No. 1,574,944, polyethylene oxides and the like.

The emulsions may also contain stabilizers such as organic mercury compounds, heterocyclic compounds, in particular mercapto substituted heterocyclic rings such as triazoles, tetrazoles or azaindenes, which are disclosed for instance by Birr in Z. wiss. photo., vol. 47, 1952, pages 2–28.

The silver halide emulsions optically sensitized according to the invention can be used for all photographic processes. They can also be used, for example, in the so-called silver dye bleaching process.

The sensitizers of the present invention are also suitable for the optical sensitization of electrophotographic layers consisting, for example, of zinc oxide as the photoconductive compound finely dispersed in an insulating binding agent.

The merocyanines according to the invention are prepared in accordance with common practice by quaternization of suitable heterocyclic bases with 2-chloropropane sultone as quaternizing agent. The preparation of this compound is described in Angew. Chemie, 70, 1958, page 502. The quaternization reaction proceeds in accordance with the following equation, sometimes in quantitative yield:

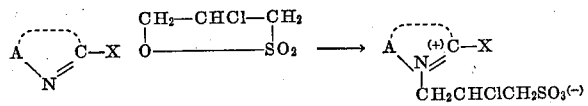

In the equation, A has the meaning indicated above and X preferably represents methylmercapto or methyl.

The methods of preparation are explained by reference to the following specific examples:

Dye I 10 g. of 2-methylmercapto-4,5-diphenyl oxazole and 7 g. of chloropropane sultone are heated for 6 hours at 120° C. After adding ethyl acetate and ether, the quaternary salt

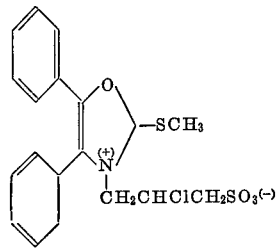

precipitates as a semi-solid mass. Yield: 8 g.

6 g. of the salt are dissolved in 30 cc. of alcohol, 2.5 g. of N-ethyl rhodanine and 2.5 cc. of triethylamine are added and room temperature is maintained for 6 hours. The reaction mixture is poured into water and extracted twice by shaking with ether. Solid common salt is added to the aqueous solution, and the dye precipitates. It is suction-filtered and recrystallized from ethanol. M.P. 208° C.

The dye has a sensitization maximum at 460 mμ.

Dye II 3 g. of the quaternary salt obtained from 2-methylmercaptobenzthiazole and 2-chloropropane sultone at 140° C. are heated with 1.5 g. of 3-ethyl rhodanine in 20 cc. of absolute alcohol and 2 cc. of triethylamine for 30 minutes at 50° C. The dye crystallizes out on cooling and is re-crystallized from acetone. M.P. 182° C. The dye has an intensive sensitization maximum at 480 mμ with a steep decay in the sensitization curve towards the long-wave region.

Dye III 6 g. of 2-methylmercaptothiazoline and 7 g. of chloropropane sultone are heated on a steam bath. The temperature of the reaction mixture rises to 108° C. and then slowly falls again. The salt which is formed is mixed, without being specially separated out, with 50 cc. of alcohol, 9 g. of 3-ethyl-5-isopropylidene rhodanine and 8 cc. of triethylamine. After 4 hours, it is poured into water, extracted with ether and the dye is precipitated from the aqueous layer with NaCl. M.P. 262° C. The sensitization maximum is 540 mμ.

On account of the steep decay of the sensitization curve, the dye shows a better degree of safety in the dark room than the analogous dye with a butane sulfo group on the thiazoline nitrogen atom.

Dye IV 3.1 g. of chloropropane sultone are heated with 3 g. of 2-methylbenzoxazole for 30 minutes at 130° C. The melt is dissolved in 50 cc. of acetic anhydride on a steam bath and the solution is boiled with 5 g. of diphenyl formamidine for 5 minutes. On stirring into ethyl acetate, the acetanilidovinyl derivative

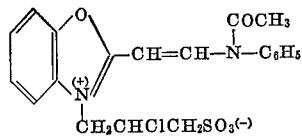

precipitates. 6.4 g. of this intermediate product are stirred with 3.2 g. of 1-methyl-3-phenyl-2-thiohydantoin in 30 cc. of methanol and 4 cc. of triethylamine for 30 minutes at 60° C. The dye precipitates on addition of NaI and is recrystallized from a mixture of methanol-H₂O (2:1). M.P. 310–311° C., sensitization maximum 525 mμ.

Dye V 3.7 g. of the intermediate product as described above are boiled for 20 minutes with 2.5 g. of 1-phenyl-3-ethyl-2-thiohydantion in 15 cc. of dry alcohol and 2. cc. of triethylamine. The dye precipitates on adding a solution of NaI in methanol and is recrystallized from a mixture of methanol-water. M.P. 333–335° C. Sensitization maximum 525 m$\mu$.

Dye VI

A vessel containing 11 g. of 2-methylmercapto pyrroline and 16 g. of 2-chloropropane sultone is introduced into a water bath at 70° C. As soon as the internal temperature of the mixture has reached the same value, the vessel is removed from the bath and cooled with cold water. Nevertheless, the internal temperature still rises to about 105° C. After the exothermic reaction has subsided, the mixture is worked up with ethyl acetate and dry ether and the yield is quantitative. 27 g. of the salt thus produced, 100 cc. of acetonitrile, 18 g. of N-ethyl-5-isopropylidene rhodanine and 15 cc. of triethylamine are kept for 2 hours at room temperature and then worked up with ether and common salt solution, as described in connection with Dye I. M.P. 249° C., sensitization maximum 532 m$\mu$.

Dye VII 3.3 g. of 4,5-bis-(4'-methoxyphenyl)-2-methylmercapto oxazole are heated with 1.6 g. of chloropropane sultone for 1 hour at 120° C. After adding 1.6 g. of 3-ethyl rhodanine, dissolved in 30 cc. of absolute alcohol, 1.1 g. of triethylamine are added to the melt, which is left standing overnight at room temperature. The solution is filtered and the dye is precipitated with ether. It is converted into the sodium salt by treatment with a solution of NaI in methanol and is recrystallized from ethanol. The dye has a sensitization maximum at 475 m$\mu$.

Dye VIII 7.2 g. of the quaternary salt obtained from 2,5-bis-(methylmercapto)-1,3,4-thiodiazole and 2-chloropropane sultone, and 3.5 g. of 3-ethyl rhodanine are stirred with 30 cc. of dry ethanol at 50° C. and 5 cc. of triethylamine are added. After stirring for 4 hours and standing overnight, 120 cc. of ether are added dropwise. The precipitated dye is recrystallized from acetone or ethanol. M.P. 143–146° C. Sensitization maximum 475 m$\mu$.

Dye IX 5 g. of the 2-methylmercapto base

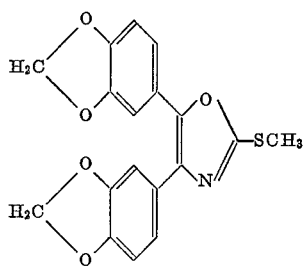

and 2.5 g. of 2-chloropropane sultone are heated in an oil bath to 145° C. After 3 hours, the product is worked up with a mixture of ethyl acetate and ether and the yield of quaternary salt is 5–6 g. 5 g. of the salt are condensed with N-ethyl rhodanine and 3 cc. of triethylamine in a mixture of 50 cc. of alcohol and 25 cc. of acetonitrile for several hours at 50° C. Working up can be carried out with ether and NaCl as with Dye I. M.P. 220° C. sensitization maximum 465 m$\mu$.

EXAMPLE

A conventional photographic silver chlorobromide gelatin emulsion, which is chemically sensitized with gold-3-chloride and is stabilized with phenyl mercapto tetrazole, is divided into 3 portions. To these portions are added 60 mg. of the Dye IX and the following two known sensitizers A and B, per kg. of emulsion.

(A)
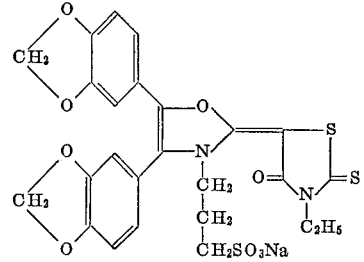

(B)
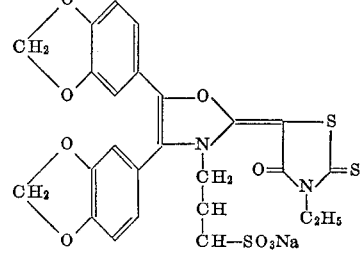

The emulsions sensitized in the manner indicated above are cast onto a transparent support, for example, of polyethylene terephthalate, and dried, and the light-sensitive layers are exposed in the usual manner behind a stepped wedge ($\sqrt[3]{2}$ per step).

Development is performed for 5 minutes in a developer having the following composition:

| | Grams |
|---|---|
| N,N-diethyl-p-phenylene diamine sulfate | 2.75 |
| Hydroxylamine sulfate | 1.2 |
| Anhydrous sodium sulfite | 2.0 |
| Sodium hexametaphosphate | 2.0 |
| Anhydrous potassium carbonate | 75 |
| Potassium bromide | 2.0 |

The emulsion which was sensitized with the sensitizing dye of the invention shows a distinctly higher sensitivity. The increase in sensitivity is 1 to 1.5° DIN.

Similar results are obtained if the emulsions additionally contain color couplers.

Instead of the foregoing dye any of the dyes of the present invention can be applied.

We claim:

1. A light-sensitive silver halide emulsion containing an optically sensitizing amount of a merocyanine having the following formula

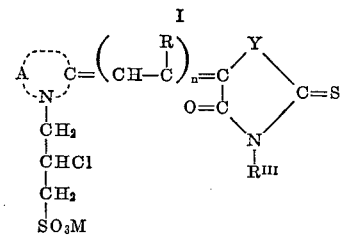

wherein

A represents the non-metallic ring members necessary to complete a 5- or 6-membered heterocyclic ring or a 5- or 6-membered heterocyclic ring containing a fused benzene or naphthalene ring;

$R^I$ stands for hydrogen or alkyl of up to 5 carbons;

Y represents sulfur or an imino group of the formula >NR$^{II}$;

$R^{II}$ stands for alkyl of up to 5 carbons or aryl;

$R^{III}$ stands for saturated or olefinically unsaturated alkyl of up to 5 carbons, carboxy substituted alkyl of up to 5 carbons, sulfo substituted alkyl of up to 5 carbons, aryl or aralkyl;

M represents a cation; and n stands for 0 or 1.

2. A light-sensitive silver halide emulsion as defined in claim 1 which contains a sensitizing dye of the following formula:

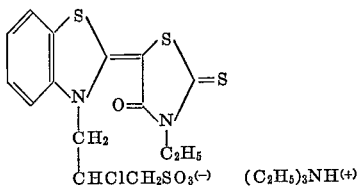

3. A light-sensitive silver halide emulsion as defined in claim 1 which contains a sensitizing dye of the following formula:

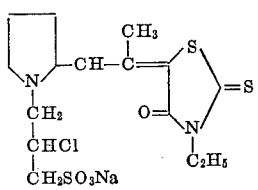

4. A light-sensitive silver halide emulsion as defined in claim 1 which contains a sensitizing dye of the following formula:

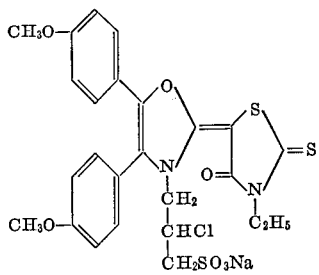

5. A light-sensitive silver halide emulsion as defined in claim 1 which contains a sensitizing dye of the following formula:

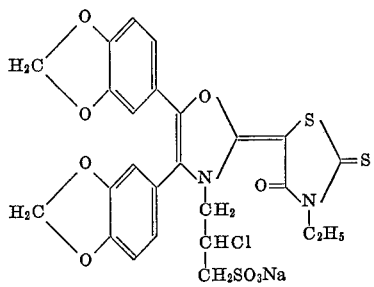

6. A light-sensitive silver halide emulsion as defined in claim 1 wherein A completes a thiazole, oxazole, selenazole, quinoline, isoquinoline, 3,3-dialkylindolenine, pyridine, oxazine, thiodiazole, oxadiazole, imidazole, pyrimidine, pyrroline or indoline ring.

References Cited

UNITED STATES PATENTS 3,288,610  11/1966  Götze et al. _____ 96—106

NORMAN G. TORCHIN, Primary Examiner

MARY F. KELLEY, Assistant Examiner

U.S. Cl. X.R.

96—106

UNITED STATES PATENT OFFICE
CERTIFICATE OF CORRECTION

Patent No. 3,480,439          Dated November 25, 1969

Inventor(s) Helmut Kampfer et al

It is certified that error appears in the above-identified patent and that said Letters Patent are hereby corrected as shown below:

Column 3, formula of Dye No. III, the methin chain of that formula should read as follows:

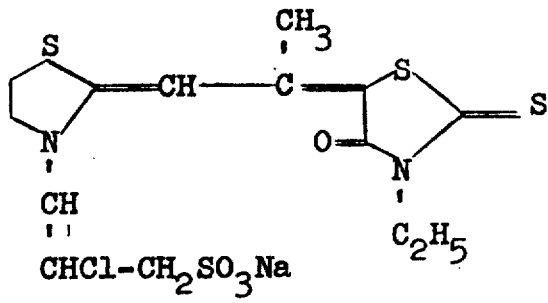

Column 4, Dye No. VI, the single bond between the left-hand heterocyclic ring and CH group should be replaced by a double bond to read as follows:

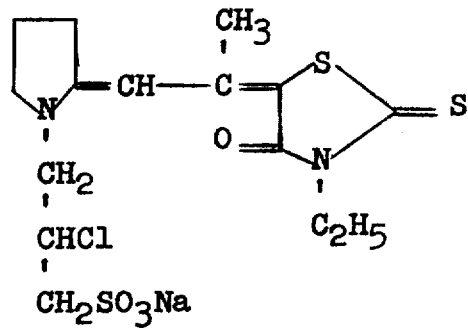

Column 4, Dye No. IX, the left-hand heterocyclic ring to which are attached the two methylenedioxy-phenyl groups must be an oxazoline ring, replacing "S" with -- O -- to read as follows:

Patent No. 3,480,439
Helmut Kampfer et al

Dated November 25, 1969
Page 2

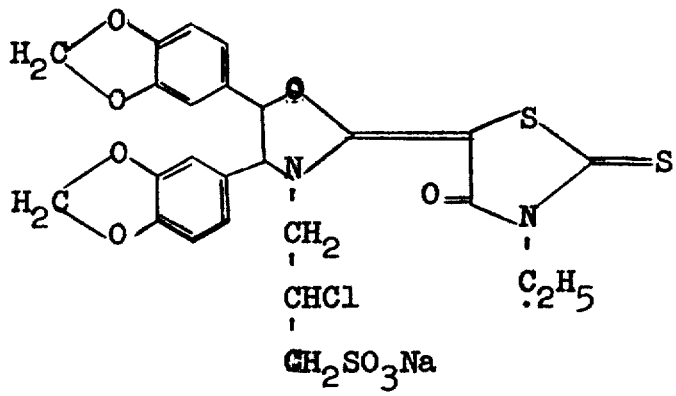

Column 6, formula in line 10, double bond in the heterocyclic ring must be inserted to read as follows:

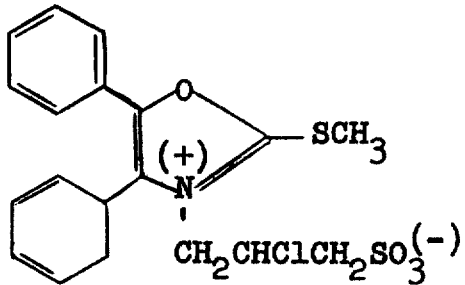

Column 8, formula of Dye No. B, double bond in the aliphatic substituent which is a 3-sulfo-2-propenyl group, must be inserted to read as follows:

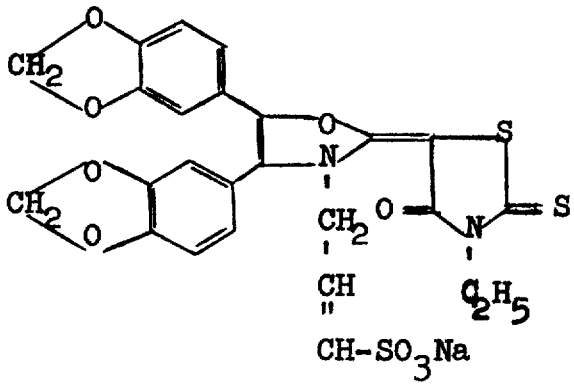

SIGNED AND
SEALED
OCT 20 1970

(SEAL)
Attest:

Edward M. Fletcher, Jr.
Attesting Officer

WILLIAM E. SCHUYLER, JR.
Commissioner of Patents